United States Patent [19]

Quamen

[11] Patent Number: 4,715,563
[45] Date of Patent: Dec. 29, 1987

[54] REEFING LINE PRESSURE REDUCER

[75] Inventor: Ronny A. Quamen, Yuma, Ariz.

[73] Assignee: The United States of America as represented by the Secretary of the Army, Washington, D.C.

[21] Appl. No.: 900,062

[22] Filed: Aug. 25, 1986

[51] Int. Cl.$^4$ ............................................. B64D 17/00
[52] U.S. Cl. ...................................... 244/152; 30/180; 244/149
[58] Field of Search ............... 244/151 A, 151 B, 152, 244/150, 142, 147, 149; 30/180; 83/580, 639

[56] References Cited

U.S. PATENT DOCUMENTS

| | | | |
|---|---|---|---|
| 2,582,113 | 1/1952 | Finken et al. | 244/149 |
| 3,036,798 | 5/1962 | Martin | 30/180 |
| 3,335,493 | 8/1967 | Gallagher | 244/152 |
| 3,378,218 | 4/1968 | Robertson et al. | 30/180 |
| 3,408,026 | 10/1968 | Kriesel | 244/152 |
| 4,227,663 | 10/1980 | Ramsey et al. | 244/152 |

Primary Examiner—Galen Barefoot
Attorney, Agent, or Firm—Saul Elbaum; Alan J. Kennecy; Thomas E. McDonald

[57] ABSTRACT

A reefing line pressure reducer and a reefing line cutter assembly are described. The pressure reducer is an element which can be incorporated into a reefing line cutter assembly to reduce pressure at the tie-off knot of a reefing line by enlarging and rounding the surface area circumscribed by the knot. The subsequent reduction of pressure at the tie-off knot reduces the likelihood of reefing line failure and consequently, poor system performance or canopy failure. The reefing line cutter assembly consists of a pyrotechnically actuated reefing line cutter, a cutter bracket, and a reefing line pressure reducer.

4 Claims, 9 Drawing Figures

REEFING LINE PRESSURE REDUCER

RIGHTS OF THE GOVERNMENT

The invention described herein may be manufactured, used, and licensed by or for the U.S. Government for governmental purposes without the payment to me of any royalty thereon.

BACKGROUND OF THE INVENTION

1. Field of the Invention

This invention relates to reefing systems for parachutes. In the use of large parachutes, reefing lines are used to restrict the inflow of air into a parachute canopy for a specified time by choking the suspension lines near their connection to the canopy to allow for uniform filling of the canopy. After a specified time period, a pyrotechnic device cuts the reefing line, and the canopy then fills to its full extent.

Reefing line stress on large parachutes (larger than 100 feet diameter) can cause reefing line failures in a large percentage of cases. Characteristically, failure occurs at the point where the reefing line is tied-off in a knot because the line is weakest at this point. Such failures cause premature canopy openings which usually result in canopy failure and always result in poor system performance.

2. Summary of the Prior Art

Pyrotechnically actuated reefing line cutters are known in the art such as the one described in U.S. Pat. No. 3,408,026. The cutter is actuated by firing a charge of pyrotechnic material when the load is dropped from the plane. This charge will ignite a pyrotechnic fuse-like line which will burn for a predetermined time before igniting an explosive compound. The resulting explosion will create pressure for driving the cutting blade forward against the reefing line, thereby severing the line and allowing the parachute to open to a full extent.

An alternative method for actuating reefing line cutters is by altitude-sensitive devices which contain miniaturized radar sensors. At a predetermined altitude, the sensors trigger a charge to actuate cutting of the reefing line.

SUMMARY OF THE INVENTION

The present invention is an apparatus for reducing pressure on a parachute reefing line at the tie-off point. The invention distributes the reefing line forces over a large area to reduce the pressure on the reefing line knot, thereby minimizing the chance of reefing line failures. The apparatus functions by increasing the surface area around which the reefing line is tied off and by smoothing edges on the tie-off area to evenly distribute the reefing line forces.

The reefing line pressure reducer can be integrated into a reefing line cutter assembly by sliding it over a reefing line cutter at the point where the line passes through the cutter and is tied off. By enlarging the surface area that the tie-off knot circumscribes, pressure on the reefing line knot when the parachute begins to fill will be reduced. The reefing line will remain intact for the predetermined time before the cutter is actuated, thereby allowing the reefing system to function properly.

BRIEF DESCRIPTION OF THE DRAWINGS

The above-mentioned objects and advantages of the present invention will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
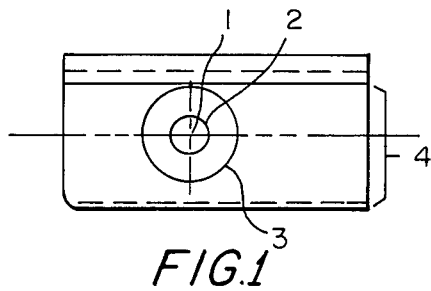
FIG. 1 is a side view of the reefing line pressure reducer.

FIG. 1 shows a side view of the reefing line pressure reducer. The ends of a reefing line pass through a reefing line channel 1, which is perpendicular to the long axis of the device, and are tied off on one face of the device. Also depicted in FIG. 1 is the funnel-shaped design on both ends of the reefing line channel 1. The circumference 2 of the channel 1 is smallest in the central part of the channel and gradually increases to the largest circumference 3 at both ends of the reefing line channel.

Figure 5:
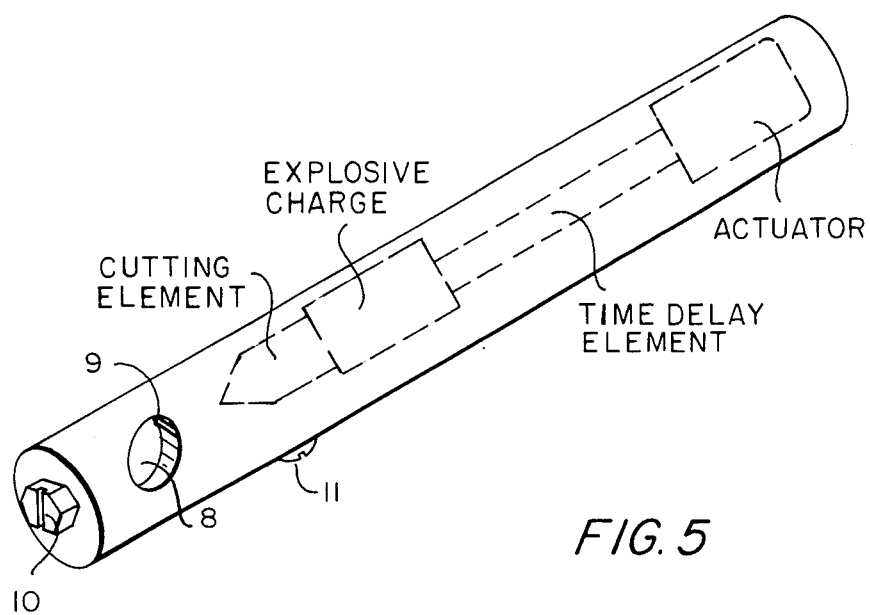
FIG. 5 is a perspective view of a reefing line cutter.

The reefing line cutter, shown in FIG. 5, passes through a cutter channel 4 which is parallel to the long axis of the device. The cutter channel 4 intersects the reefing line channel 1 and is shaped so that it accommodates a reefing line cutter.

Figure 2:
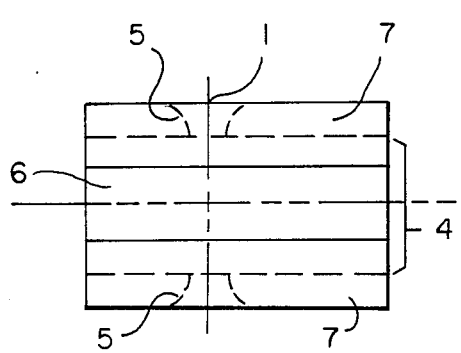
FIG. 2 is a top view of the reefing line pressure reducer.

FIG. 2 shows a top view of the reefing line pressure reducer. The funnel-shaped ends 5 of the reefing line channel 1 are shown in FIG. 2. The top surface of the reefing line pressure reducer has a plateau 6 with sloping rounded edges 7 on both sides of the plateau 6.

Figure 3:
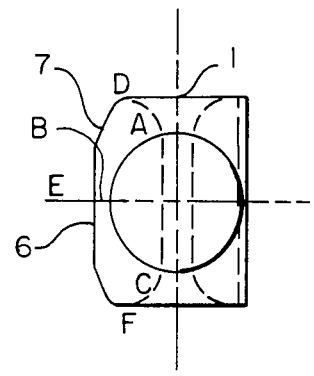
FIG. 3 is an end view of the reefing line pressure reducer.

FIG. 3 is an end view of the reefing line pressure reducer. This view illustrates two important features of the invention. The first is a comparison between the surface area bounded by the tie-off knot in a conventional cutter assembly and that same area in a cutter assembly with a reefing line pressure reducer. The surface area ABC, depicted in this drawing, is the surface area around which a reefing line tie-off knot is tied on a conventional cutter. When a reefing line pressure reducer is introduced to the cutter assembly, the tie-off surface area is increased to ADEFC. Such an increase in surface area reduces the pressure on the reefing line knot. The second important feature depicted by FIG. 3 is that the tie-off surface area, when the reefing line pressure reducer is in use, has rounded edges to reduce the stress on the reefing line at any particular point. These advantages of the invention, by reducing stress on the tie-off knot, reduce the likelihood of reefing line failure.

Figure 4:
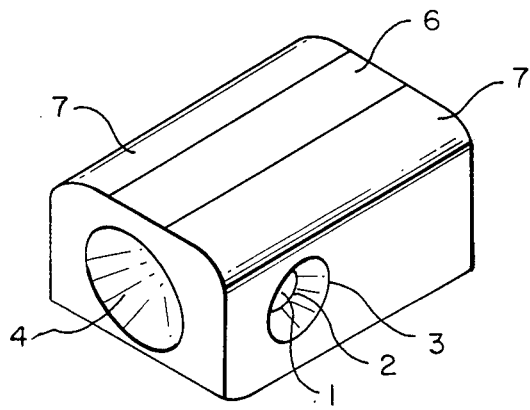
FIG. 4 is a perspective view of the reefing line pressure reducer.

FIG. 4 is a perspective view of the reefing line pressure reducer. The cutter channel 4 receives a reefing line cutter. The reefing line cutter, shown in FIG. 5, has a channel 8, which, when the cutter engages the reefing line pressure reducer, is aligned with the reefing line channel 1 of the reefing line pressure reducer. A reefing line can then be passed through the aligned channels 5 and tied off across the top plateau 6 and edges 7 of the device.

FIG. 5 illustrates a reefing line cutter which is inserted into the cutter channel 4 of the reefing line pressure reducer. The cutter has a channel 8 which aligns with the reefing line channel 1 of the invention when the two pieces are assembled. The circumference 9 of the channel 8 in the cutter is substantially the same as the circumference 2 in the cetnral part of the reefing line channel 1 of the reefing line pressure reducer. Also depicted in FIG. 5 are first and second cutter screws 10, 11 for attaching the cutter to the cutter bracket, shown in FIG. 6. When the cutter and bracket are assembled, the first cutter screw 10 is inserted through the first hole 13 in the bracket and then engaged in the cutter. The second cutter screw 11 engages the cutter directly and is merely seated into the second hole 14 in the bracket to prevent rotation of the cutter with respect to the bracket.

The pyrotechnic mechanism for cutting the reefing line is housed entirely within the reefing line cutter. The mechanism consists of an actuator, a time delay element, an explosive charge, and a cutting element. The actuator is set off before the load is dropped from the plane. The time delay element allows the load to drop for a predetermined time before the explosive charge ignites to drive a cutting blade forward, and thereby cut the reefing line.

Figure 6:
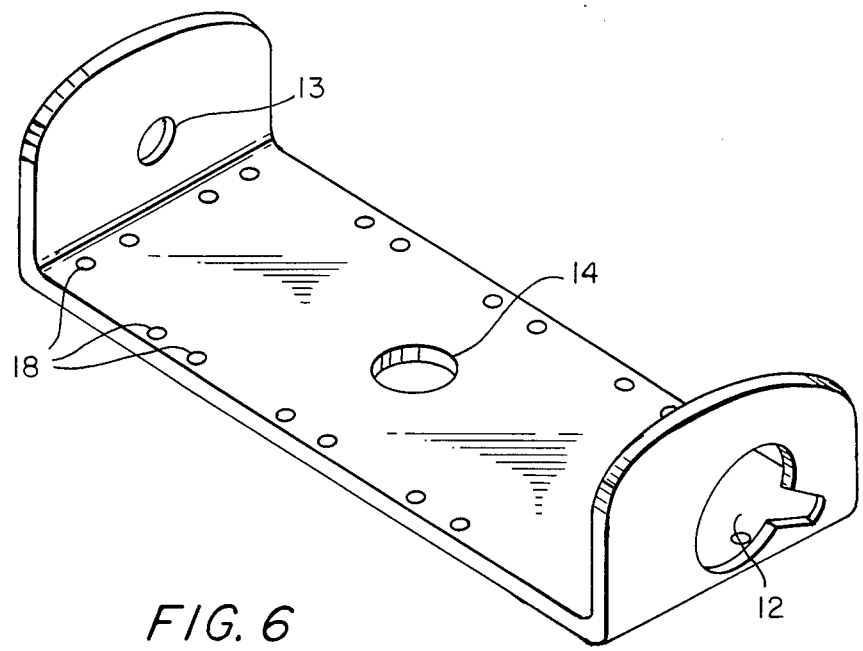
FIG. 6 is a perspective view of a reefing line cutter bracket.

FIG. 6 shows a cutter bracket for supporting the reefing line cutter. Illustrated is an aperture 12 for inserting the reefing line cutter into the bracket. To allow passage of the second cutter screw 11 on the cutter, the aperture 12 is irregularly shaped. Once the cutter is in place, the first cutter screw 10 is inserted through a first hole 13 in the bracket and engages the cutter. The second cutter screw 11, already engaged in the cutter, is seated in a second hole 14 in the bracket. The small holes 18 located on the perimeter of the base of the bracket allow the bracket to be sewn onto the parachute canopy.

Figure 7:
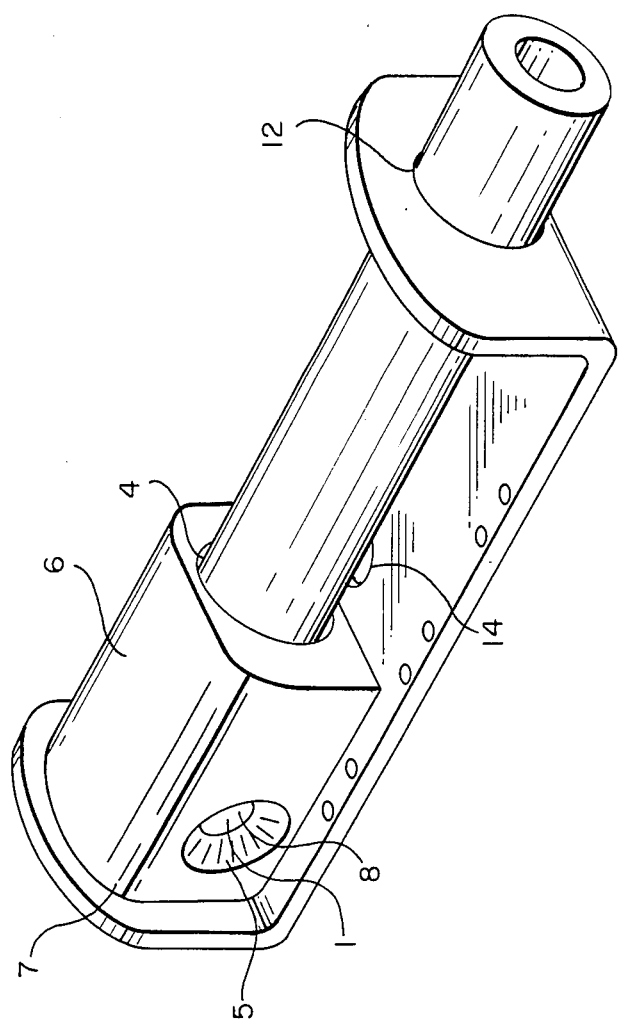
FIG. 7 is a perspective view of the reefing line pressure reducer assembled with a reefing line cutter and cutter bracket.

FIG. 7 illustrates the reefing line pressure reducer assembled with the reefing line cutter and bracket. The reefing line cutter is inserted into the cutter channel 4 of the reefing line pressure reducer. In this position the reefing line channel 1 of the invention aligns with the channel 8 in the cutter.

Figure 8:
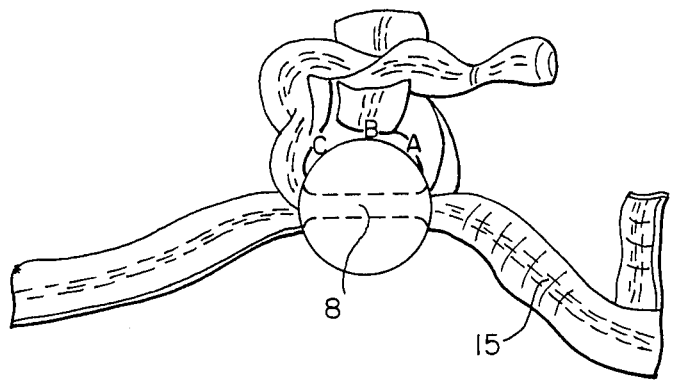
FIG. 8 is an end view of a reefing line tie-off through a reefing line cutter.

FIG. 8 depicts an end view of the reefing line tie-off around a reefing line cutter, without the reefing line pressure reducer. The ends of the reefing line 15 pass through the channel 8 of the cutter and are tied off around the cutter, circumscribing the area ABC.

Figure 9:
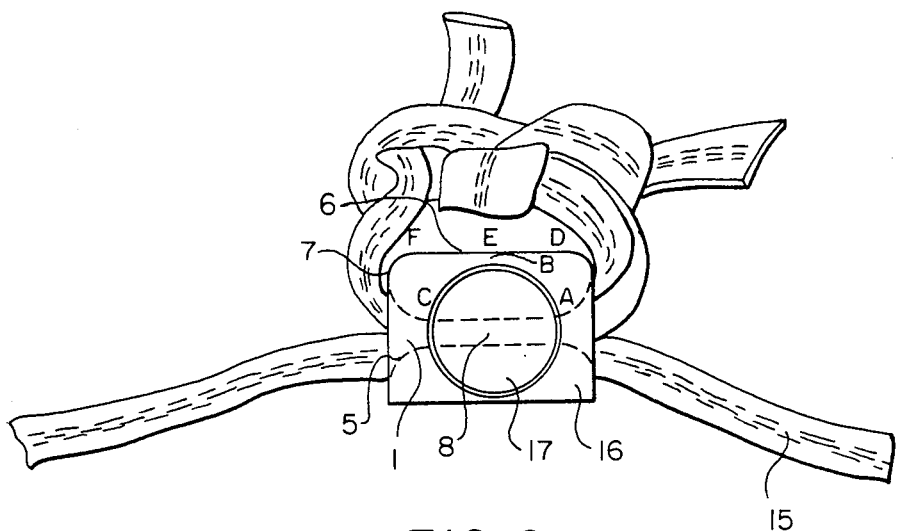
FIG. 9 is an end view of a reefing line tie-off through the reefing line pressure reducer-reefing line cutter assembly.

FIG. 9 depicts an end view of a reefing line tie-off around a reefing line cutter assembled with a reefing line pressure reducer. The reefing line cutter 17 is inserted into the reefing line pressure reducer 16, and the channel 8 aligns with the reefing line channel 1. The ends of the reefing line 15 pass through the aligned channels 8 and 1 of the cutter and reefing line pressure reducer and are tied off by knotting the ends of the reefing line across the face of the reefing line pressure reducer.

As can be seen in FIG. 9, the tie-off area circumscribed by the reefing line knot is increased by the use of the reefing line pressure reducer to an area ADEFC. This increased surface area for the tie-off knot reduces the pressure on the reefing line during the reefing stage by distributing the stress over a greater surface area. Because of the reduced pressure on the line, the likelihood of reefing line failures is substantially lowered. The invention also provides the advantage of a generally smooth and rounded tie-off area.

While a preferred embodiment of the invention is disclosed herein for purposes of explanation, numerous changes, modifications, variations, substitutions and equivalents, in whole or in part, will now be apparent to those skilled in the art to which the invention pertains. Accordingly, it is intended that the invention be limited only by the spirit and scope of the appended claims.

I claim:

1. In a reefing line cutter assembly having
a cutter bracket;
a reefing line cutter held in place by said cutter bracket with a first channel for receiving a reefing line, means for cutting said reefing line, a second channel for receiving said cutting means, and means in said second channel for actuating said cutting means; the improvement characterized by a reefing line pressure reducer comprising:
an element of substantially rectangular cross section;
a reefing line channel within said element for receiving the ends of said reefing line which loop through said reefing line channel and terminate in a knot juxtaposed against said element;
and a cutter channel within said element, perpendicular to and intersecting with said reefing line channel, for receiving means for cutting said reefing line;
wherein said cutter channel engages said reefing line cutting means, and said reefing line channel and said first channel align for receiving the reefing line; and
wherein said pressure reducer element has smooth rounded edges and has the cross-sectional shape of a pillow to cause the reefing line adjacent to the tie-off area circumscribed by the knot to be subjected to less stress than said elements containing edges with shorter radii.

2. A reefing line cutter assembly, as described in claim 1, wherein sid reefing line channel is funnel-shaped at both ends with the channel circumference narrowest in the central portion of said channel and gradually enlarging to both ends.

3. A reefing line cutter assembly, as described in claim 1, wherein two rounded edges on the reefing line pressure reducer which are perpendicular to said reefing line channel contact the reefing line when tied off.

4. A reefing line cutter assembly as described in claim 2, wherein two rounded edges on the reefing line pressure reducer which are perpendicular to said reefing line channel contact the reefing line when tied off.

* * * * *